(12) United States Patent
Ohshiro et al.

(10) Patent No.: US 7,318,445 B2
(45) Date of Patent: Jan. 15, 2008

(54) FUEL VAPOR PIPE STRUCTURE OF FUEL TANK

(75) Inventors: Atsushi Ohshiro, Kanagawa (JP); Ryo Nishino, Kanagawa (JP)

(73) Assignee: Piolax, Inc., Yokohama-Shi, Kanagawa-Ken (JP)

( * ) Notice: Subject to any disclaimer, the term of this patent is extended or adjusted under 35 U.S.C. 154(b) by 25 days.

(21) Appl. No.: 11/038,098

(22) Filed: Jan. 21, 2005

(65) Prior Publication Data

US 2005/0172999 A1    Aug. 11, 2005

(30) Foreign Application Priority Data

Feb. 10, 2004    (JP)    ............ P.2004-033286

(51) Int. Cl.
*F16K 24/04*    (2006.01)
(52) U.S. Cl. .................... 137/202; 137/43
(58) Field of Classification Search ............ 137/43, 137/202
See application file for complete search history.

(56) References Cited

U.S. PATENT DOCUMENTS

| | | | | |
|---|---|---|---|---|
| 3,614,960 | A * | 10/1971 | Pfrengle ............... | 137/43 |
| 3,799,132 | A * | 3/1974 | MacGuire .............. | 123/587 |
| 5,259,353 | A * | 11/1993 | Nakai et al. ........... | 123/518 |
| 6,058,970 | A * | 5/2000 | Osaki et al. ........... | 137/587 |
| 6,062,250 | A * | 5/2000 | Takahashi ............. | 137/202 |
| 6,343,590 | B1 * | 2/2002 | Nagai et al. ........... | 123/518 |
| 6,409,225 | B1 * | 6/2002 | Ito ...................... | 285/222.1 |
| 6,604,539 | B1 * | 8/2003 | Strohmayer et al. .... | 137/43 |
| 6,655,403 | B2 * | 12/2003 | Mills .................... | 137/2 |
| 6,769,453 | B2 * | 8/2004 | Nishino et al. ........ | 138/121 |
| 2001/0047822 | A1 * | 12/2001 | Aoki et al. ............ | 137/202 |
| 2002/0083974 | A1 * | 7/2002 | Duermeier et al. ..... | 137/202 |
| 2004/0086331 | A1 * | 5/2004 | Iwamoto ............... | 403/327 |

FOREIGN PATENT DOCUMENTS

JP    2003-49976    2/2003

* cited by examiner

*Primary Examiner*—John Rivell
*Assistant Examiner*—Craig Price
(74) *Attorney, Agent, or Firm*—McGinn IP Law Group, PLLC

(57) ABSTRACT

In a fuel vapor pipe structure including a plurality of cut valves for passing or cutting a fuel vapor at inside of a fuel tank, a pipe joint connected to the cut valves for communicating the fuel vapor to a canister, and a resin tube for connecting the cut valve and the pipe joint, the resin tube is bent to pipe by making a length of the resin tube longer than a length of connecting connection tube portions of the cut valve and connection tube portions of the pipe joint and arranging the connection tube portion of the cut valve to shift from a straight line of connecting a center of the cut valve and a center of the pipe joint by a predetermined angle in a horizontal direction.

20 Claims, 8 Drawing Sheets

FUEL VAPOR PIPE STRUCTURE OF FUEL TANK

BACKGROUND OF THE INVENTION

1. Field of the Invention

The present invention relates to a fuel vapor pipe structure of a fuel tank of an automobile, particularly relates to a fuel vapor pipe structure using a resin tube.

2. Description of the Related Art

A fuel tank of an automobile is attached with a cut valve for escaping fuel vapor at inside of a fuel tank to outside and preventing fuel rocked by turning or inclining the automobile from leaking to outside of the fuel tank.

Generally, the cut valve is connected to a check valve for making fuel vapor flow to outside when a fuel vapor pressure is higher than a predetermined value and connected to a canister arranged outside of the fuel tank from the check valve.

In connecting the cut valve and check valve, normally, the cut valve and the check valve are connected by outwardly fitting end portions of a tube made of rubber to respective connection tube portions thereof and fastening an outer periphery of the tube made of rubber by hose straps.

Further, there is disclosed a fuel vapor pipe integrated to inside of a fuel tank of an automobile in JP-A-2003-49976, shown below. The fuel vapor pipe is attached to an inner face of an upper wall of the fuel tank and including two branch tubes which include filters at distal ends thereof, a leadout tube led out to outside of the fuel tank is extended from a joining portion of the branch pipe and the leadout tube is connected to a canister via an outside tube. Further, it is described that a tube formed by a composition of a mixture resin of 6, 6-nylon and 6-nylon is used for the pipes.

According to the pipe structure of the background art using a tube made of rubber, after outwardly fitting the tube made of rubber to the connection tube portion, the tube needs to be connected and fixed by the hose strap and therefore, there poses a problem that operability and handling performance are poor and fabrication cost is also high.

In contrast thereto, the resin tube used in the pipe structure of JP-A-2003-49976 comprises a tube made of a resin and therefore, there is achieved an advantage that the tube is light-weighted, handling performance thereof is excellent and fabrication cost is also inexpensive.

However, although in such a pipe structure, strict dimensional accuracy is requested for the resin tube, actually, the dimension is liable to be dispersed by various dispersions, for example, a dispersion by cutting in molding the resin tube, a dispersion by a press-fitting margin in press-fitting the resin tube to connection tubes of respective valve members, a dispersion by contracting the resin tube by a temperature change after being attached to the fuel tank or evaporation of moisture in the resin tube, a dispersion by swelling the resin tube by adhering fuel vapor and so on. Other than these, there is also brought about a dispersion in a distance between the valves by dispersions in dimensional accuracies of a valve member, a bracket connected to a valve member, or the fuel tank per se.

Further, the resin tube is devoid of flexibility and difficult to be elongated in comparison with the tube made of rubber and therefore, when the resin tube is going to attach to inside of the fuel tank in a state of being previously connected with the cut valve or the check valve, by dispersion in an interval between the cut valve and check valve to be connected, there is brought about a drawback that the valves cannot be connected since a length of the resin tube becomes deficient, even when the valves can be connected, the resin tube is liable to be drawn out, and when conversely, the length becomes excessively long, the resin tube is brought into contact with other part to interfere therewith, or a middle portion of the resin tube is hung down and fuel is liable to be stored at the middle of the tube.

SUMMARY OF THE INVENTION

Therefore, it is an object of the invention to provide a fuel vapor pipe structure of a fuel tank which can firmly connect a resin tube even when there is a dispersion in a dimension of the resin tube, a cut valve, a fuel tank or the like and is not brought into contact with other part and in which a middle of the resin tube does not hang down to a lower side.

In order to achieve the above-described object, according to a first aspect of the invention, there is provided a fuel vapor pipe structure of a fuel tank characterized in a fuel vapor pipe structure of a fuel tank including a plurality of cut valves for passing a fuel vapor at inside of a fuel tank and cutting a path of a fuel when a liquid face of the fuel rises, a pipe joint connected to the cut valves for communicating the fuel vapor to a pipe for delivering the fuel vapor to a canister, and a resin tube for connecting the cut valve and the pipe joint, wherein the resin tube is bent to pipe by making a length of the resin tube longer than a length of connecting a connection tube portion of the cut valve and a connection tube portion of the pipe joint by a straight line and arranging the connection tube portion of the cut valve to shift from a straight line connecting a center of the cut valve and a center of the pipe joint by a predetermined angle in a horizontal direction.

According to the first aspect of the invention, by making the length of the resin tube longer than the length of connecting the connection tube portion of the cut valve and the connection tube portion of the pipe joint by the straight line, even when there is a dispersion in a dimension of the resin tube, the valve, the fuel tank or the like, the resin tube can be attached thereto with an allowance, thereby, sealing performance between the cut valve and the resin tube as well as between the pipe joint and the resin tube can be ensured.

Further, by arranging the connection tube portion of the cut valve to be shifted from the straight line connecting the center of the cut valve and the center of the pipe joint by the predetermined angle in the horizontal direction, an extra length portion is absorbed by bending the resin tube in the horizontal direction and therefore, there can be resolved a drawback of storing fuel by hanging down the resin tube at a middle thereof and interfering with other member thereby, a large load is not applied to the cut valve or the pipe joint via the resin tube and a concern of destruction or the like is eliminated.

According to a second aspect of the invention, a pair of the cut valves are provided at positions opposed to each other relative to the pipe joint, and the connection tube portions of the pair of cut valves are arranged to shift from the straight line connecting the center of the cut valve and the center of the pipe joint in directions opposed to each other in the horizontal direction in the first aspect of the invention.

According to the second aspect of the invention, when the resin tubes are connected to the respective connection tube portions to pipe, the resin tubes are bent substantially in point symmetry centering on the pipe joint and therefore, end portions of the respective resin tubes can be inserted to connect to the connection tube portions of the pipe joint substantially from coaxial directions and therefore, a forcible bent portion is not produced in the resin tube and stresses applied to the pipe joint and the resin tube can be alleviated.

According to the fuel vapor pipe structure, an allowance is provided to the length of the resin tube, dispersions in dimensions of the respective parts are made to be able to be absorbed, a direction of bending the resin tube when piped is rectified and it can be prevented that the resin tube interferes with other member, or is stored with a liquefied fuel and stresses which are not anticipated in designing can be prevented from being applied to the cut valve or the pipe joint.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
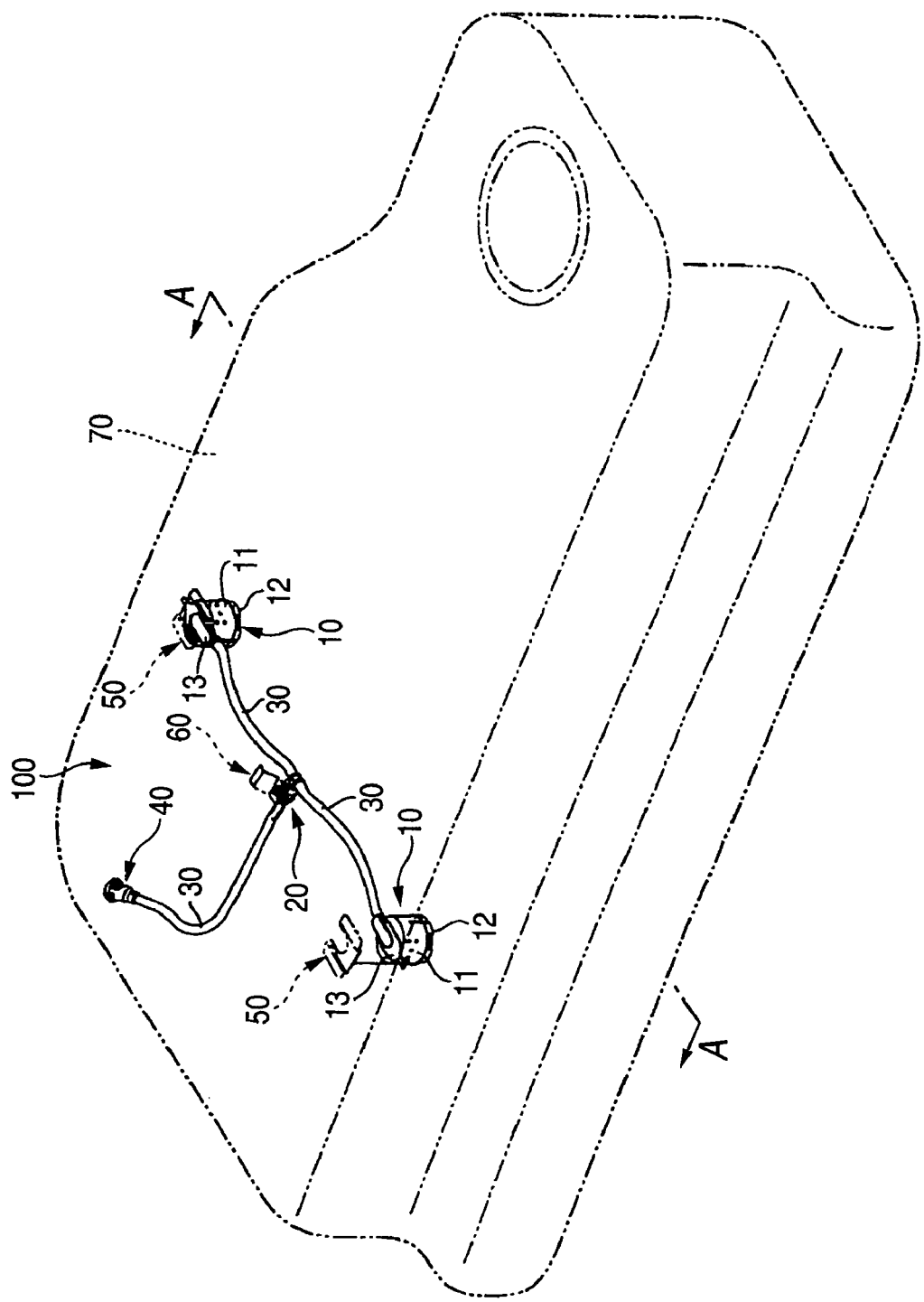
FIG. 1 is a perspective view of a total showing an embodiment of a fuel vapor pipe structure of a fuel tank according to the invention.
Figure 2:
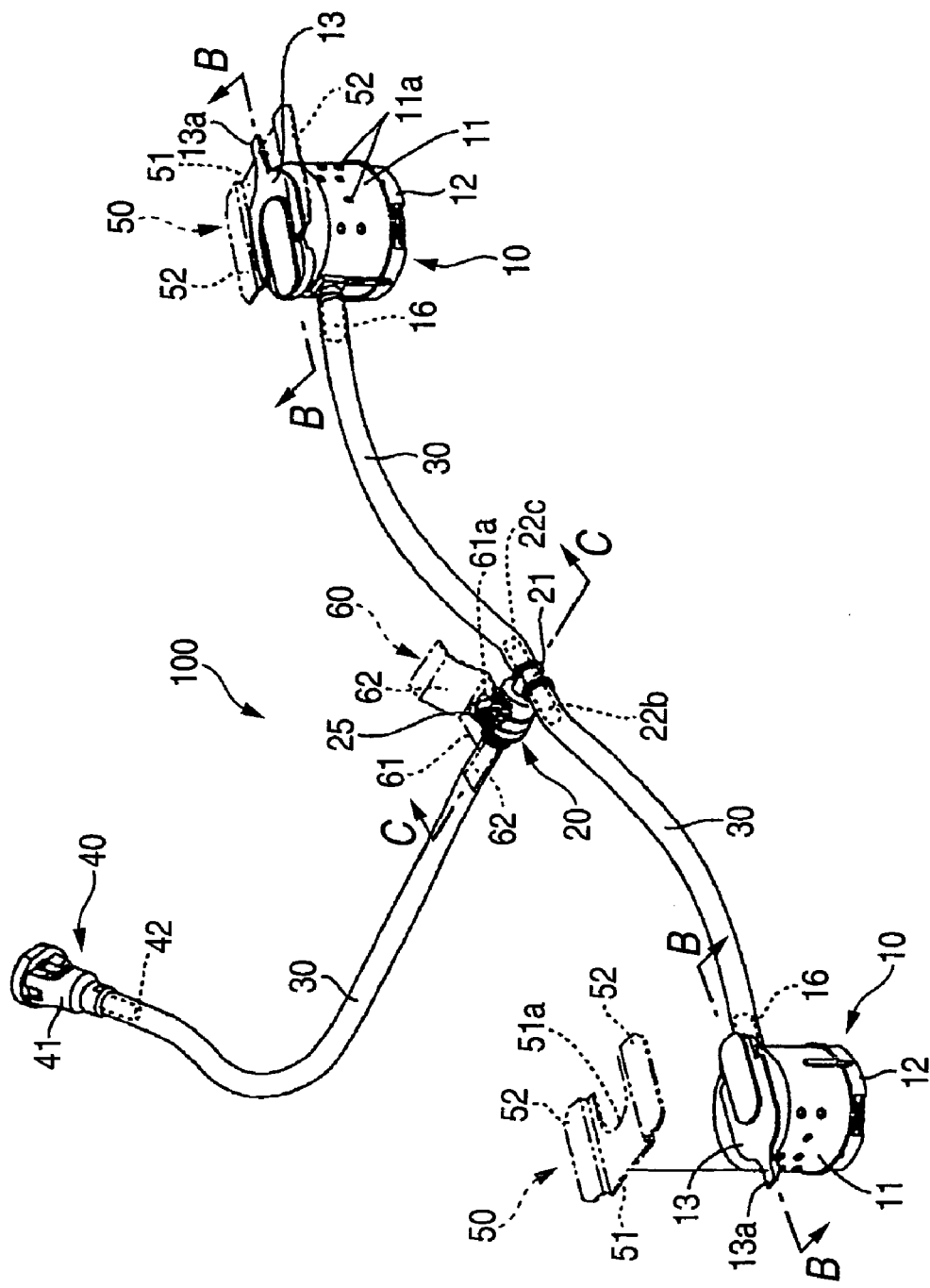
FIG. 2 is an enlarged perspective view of the fuel vapor pipe structure of the fuel tank.
Figure 3:
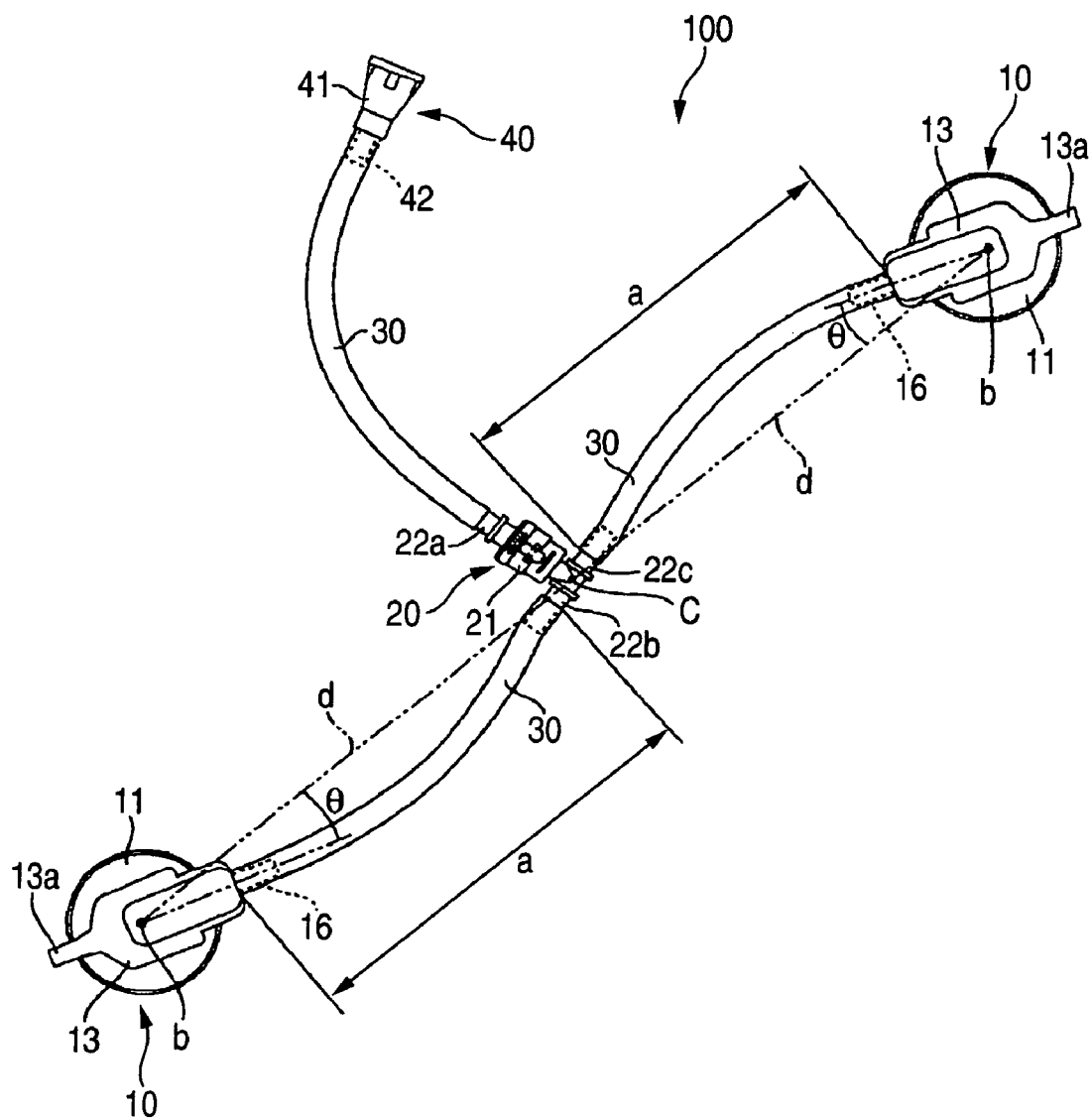
FIG. 3 is a plane view of the fuel vapor pipe structure of the fuel tank.
Figure 4:
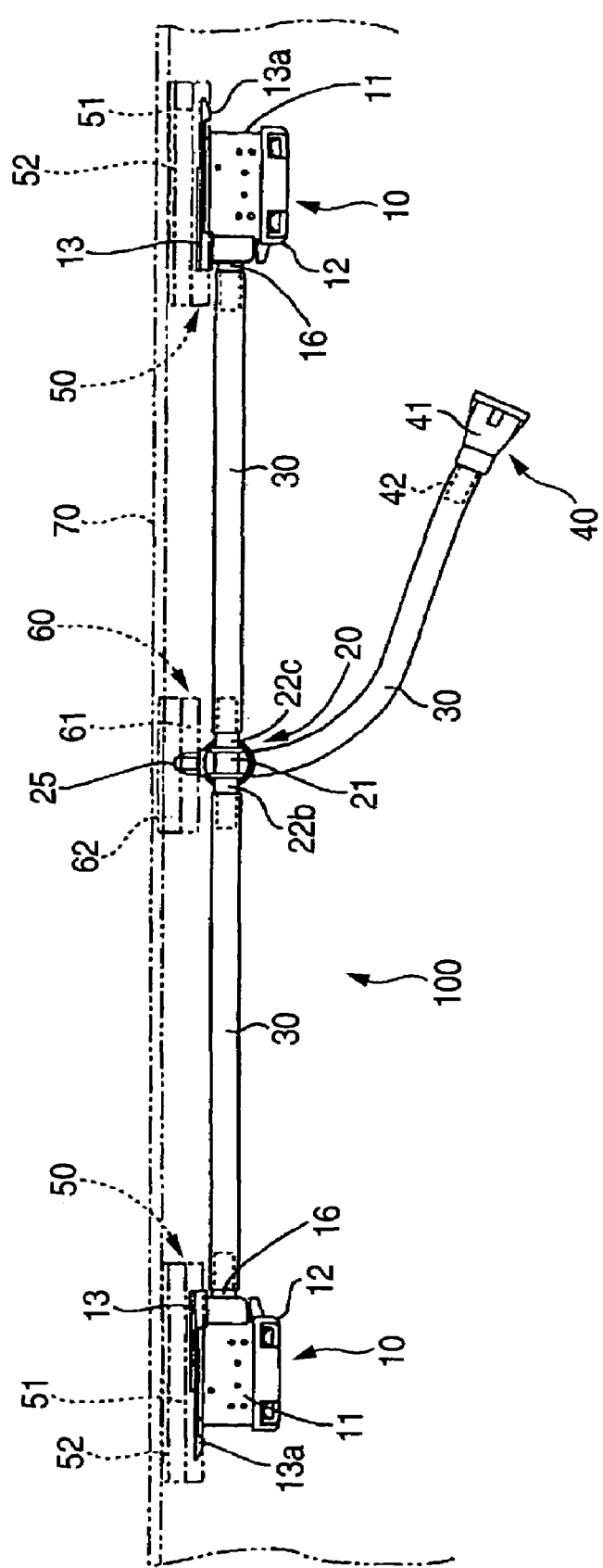
FIG. 4 is a side view taken along an arrow mark line A-A of FIG. 1 of the fuel vapor pipe structure of the fuel tank.
Figure 5:
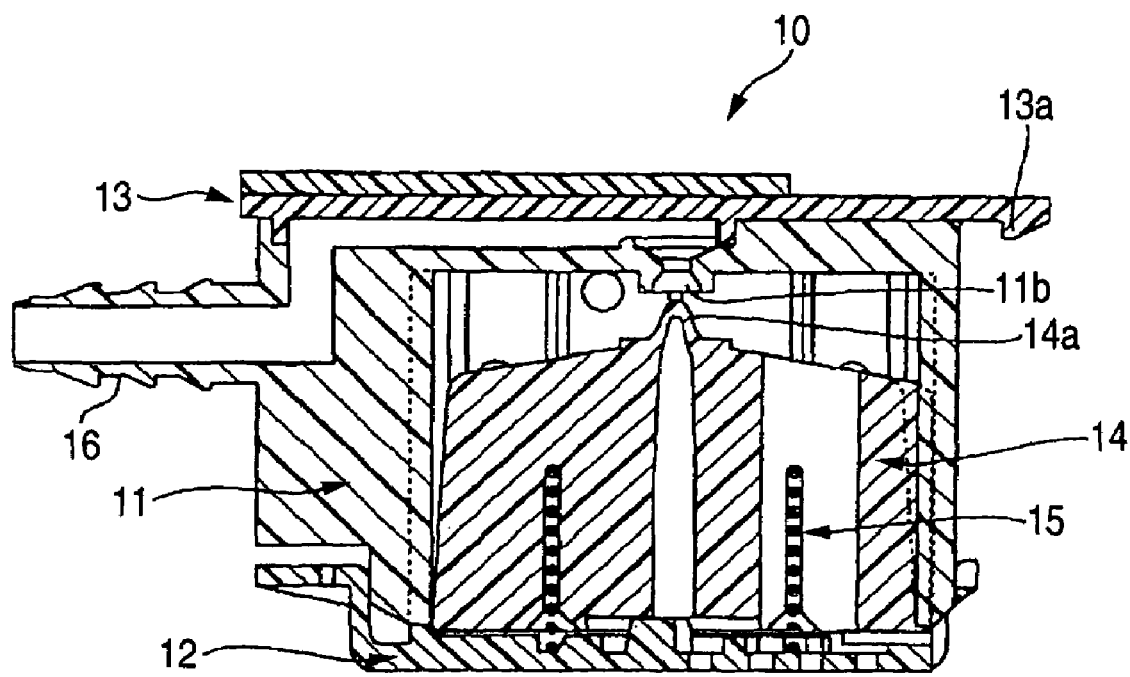
FIG. 5 is a sectional view of taken along an arrow mark line B-B of FIG. 2 of a cut valve which is a constituent member of the fuel vapor pipe structure of the fuel tank.
Figure 6:
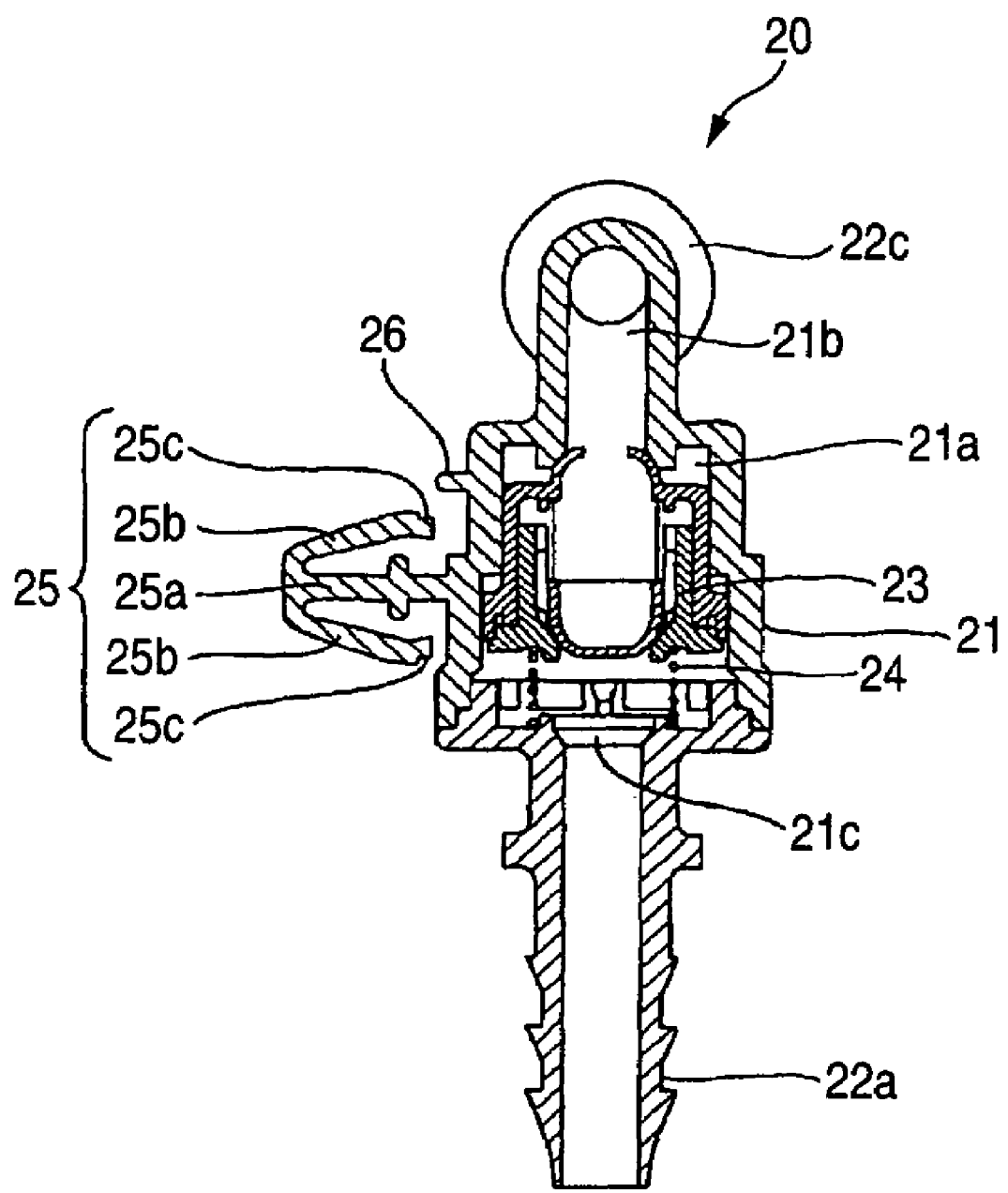
FIG. 6 is a sectional view taken along an arrow mark line C-C of FIG. 2 of a pipe joint which is a constituent member of the fuel vapor pipe structure of the fuel tank.

An embodiment of the invention will be explained in reference to the drawings as follows. FIGS. 1 through 6 show an embodiment of a fuel pipe structure of a fuel tank. FIG. 1 is a perspective view showing a total of a fuel vapor pipe structure of the fuel tank, FIG. 2 is a perspective view enlarging the fuel vapor pipe structure of the fuel tank, FIG. 3 is a plane view of the fuel vapor pipe structure of the fuel tank, FIG. 4 is a side view of the fuel vapor structure of the fuel tank taken along an arrow mark line of A-A of FIG. 1, FIG. 5 is a sectional view of a cut valve which is a constituent member of the fuel vapor pipe structure of the fuel tank taken along an arrow mark line of B-B of FIG. 2, and FIG. 6 is a sectional view of a pipe joint which is a constituent member of the fuel vapor pipe structure of the fuel tank taken along an arrow mark line of C-C of FIG. 2.

As shown by FIG. 1, a fuel vapor pipe structure 100 of the fuel tank is mainly constituted by a pair of cut valves 10, 10 arranged at inside of a fuel tank 70, a pipe joint 20 disposed substantially at a center when the pair of cut valves 10, 10 are arranged, and a resin tube 30 for connecting the pair of cut valves 10, 10 and the pipe joint 20. Although the fuel tank 70 may be made of a metal or made of a resin, according to the embodiment, a fuel tank made of a metal is used.

First, respective members constituting the pipe structure 100 will be explained.

The cut valve 10 is constituted by a valve case 11 substantially in a cylindrical shape, a cap 12 for closing an opening portion of a lower face of the valve case 11, and an inserting piece 13 for closing an opening portion of an upper face of the valve case 11.

The cut valve 10 normally makes fuel vapor at inside of the fuel tank flow to the resin tube 30 via a connection tube portion 16 to deliver to the pipe joint 20. Further, when a liquid face of a fuel at inside of the fuel tank rises and a float valve 14 is immerged as in the case in which an automobile or the like is turned or rocked laterally, the float valve 14 is floated up by a buoyancy of the float valve 14 and an urging force of a spring 15, and a valve head 14a is brought into contact with a valve seat 11b to close the opening portion. As a result, fuel can be prevented from flowing out to the connection tube portion 16 via the opening portion of the valve seat 11b.

According to the embodiment, the pipe joint 20 includes a check valve at inside thereof. That is, as shown by FIG. 6, the pipe joint 20 includes a main body portion 21 substantially in a cylindrical shape, a connection tube portion 22a coaxially connected to the main body portion 21, and a pair of connection tube portions 22b, 22c opposed to each other connected to the main body portion 21 in a T-like shape.

Further, the connection tube portions 22b, 22c are connected with the resin tubes 30 connected with the cut valves 10, and the connection tube portion 22a is connected with the resin tube 30 connected to a pipe for leading out the fuel vapor to outside of the fuel tank via a connector 40.

The pipe joint 20 is connected to the cut valves 10, 10 via the resin tubes 30. That is, fuel vapor at inside of the fuel tank 70 flows into the resin tubes 30 via the pair of cut valves 10 and flows into the pipe joint 20.

Further, when an inner pressure by fuel vapor at inside of the fuel tank 70 exceeds a predetermined value, fuel vapor flows into the pipe joint 20 from the pair of cut valves 10 and the resin tubes 30, mentioned above, a valve member 23 is slid against a spring 24, a lead in port 21b is opened, and fuel vapor introduced via the connecting tubes 22b, 22c flows into a valve chamber 21a. The fuel vapor flows out from a lead out port 21c to the connection tube 22a by passing a clearance at an outer periphery of the valve member 23 and is delivered to a canister, not illustrated, arranged at outside of the fuel tank 70 via a pipe led out to outside of the fuel tank 70 connected via the connector 40 by passing the resin tube 30 connected to the connection tube 22a.

Further, an outer wall of the main body portion 21 is integrally formed with a clip 25. The clip 25 includes a stem portion 25a extended from a wall portion of the main body portion 21, and a pair of elastic lock pieces 25b extended from a front end of the stem portion 25a to a side of the main body portion 21 in an anchor-like shape, and the elastic lock pieces 25b are formed with stepped portions 25c. Further, the wall portion of the main body portion 21 is formed with pressing portions 26, 26 for being brought into contact with a metal bracket 60, mentioned later, in a shape of ribs in parallel with each other. Further, the main body portion 21 is attached to the metal bracket 60 by the clip 25 and the pressing portion 26.

As described above, the cut valve 10 and the pipe joint 20 as well as the pipe joint 20 and the connector 40 are connected by using the resin tubes 30. An inner diameter of the resin tube 30 is molded to be slightly smaller than an outer diameter of the connection tube portion 16 of the cut valve 10, the connection tube portions 22a, 22b, 22c, 22d of the pipe joint 20, and a connection tube portion 42 of the connector 40 and the resin tubes 30 are press-fitted to the connection tube portions.

Although a method of molding the resin tube 30 is not particularly limited, the resin tube 30 is extruded from, for example, a die of an extrusion molding machine in a tube-like shape, and sized to solidify in a vacuum cooling tank to mold in a shape of a straight tube. Further, although the resin tube 30 is molded in the shape of the straight tube according to the embodiment, depending on cases, the resin tube 30 may be molded in a bent shape or the like by molding by heating or the like. When the resin tube 30 is previously provided with a bent shape, in connecting the cut valve 10 to a metal bracket 50, the resin tube 30 becomes easy to bend and easy to integrate.

As a material of the resin tube 30, particularly when the resin tube 30 is previously arranged at inside of the metal tank, in order to provide heat resistance in later baking and coating steps thereto, a resin having high heat resistance, for example, polyamide species resin of 6-nylon, 6, 6-nylon or the like is preferably used. Further, a resin may be reinforced by glass fiber or the like.

The connector 40 is constituted by a main body portion 41 in a cylindrical shape and the connection tube portion 42 extended from the main body portion 41. Further, other end of the resin tube 30 one end of which is connected to the connection tube portion 22a of the pipe joint 20 is press-fitted to the connection tube portion 42 of the connector 40 to connect. Further, the main body portion 41 is provided with an engaging structure connected with a pipe, not illustrated, led out to outside the fuel tank by one touch motion. Such an engaging structure has already been well known and therefore, an explanation thereof will be omitted. The pipe led out to outside of the fuel tank is connected to a canister, not illustrated, via a tube arranged at the outside.

The metal bracket 50 for fixing the cut valve 10 is formed by a bottom wall 51 having a notched portion 51a in a channel-like shape inserted with a base portion of the inserting piece 13 formed at the cut valve 10, and both side portions 52 raised from both sides of the bottom wall 51 and extended to outer sides by being folded to bend in an L-like shape. The metal bracket 50 is fixedly attached to the fuel tank 70 made of a metal by a welding method of spot welding or the like.

Further, by inserting the base portion of the inserting piece 13 formed at the cut valve 10 into the notched portion 51a of the metal bracket 50, engaging the inserting piece 13 onto the bottom wall 51 of the metal bracket 50 and engaging a claw portion 13a at a front end of the inserting piece 13 to an end edge of the bottom wall 51 of the metal bracket 50, the cut valve 10 is attached to the fuel tank 70 via the metal bracket 50.

The metal bracket 60 for fixing the pipe joint 20 is formed by a bottom wall 61 formed with an attaching hole 61a for inserting the clip 25 formed at the pipe joint 20 at a center thereof and both side portions 62 skewedly raised from both sides of the bottom wall 61 and extended to outer sides by being folded to bend. Also the metal bracket 60 is fixedly attached to the fuel tank 70 made of a metal by a welding method of spot welding or the like similar to the above-described case of the metal bracket 50.

Further, when the clip 25 formed at the pipe joint 20 is inserted into the attaching hole 61a, diameters of the elastic lock pieces 25b, 25b are contracted along an inner diameter of the attaching hole 61a. When the clip 25 is pressed further, the stepped portions 25c, 25c are drawn out to a side opposed to the attaching hole 61a to engage with a peripheral edge of the attaching hole 61a, further, the pressing portion 26 is brought into contact with the bottom wall 61 of the metal bracket 60 to thereby attach the pipe joint 20.

Next, an explanation will be given of a relationship of arranging the pair of cut valves 10, 10, the pipe joint 20 and the resin tubes 30 in reference to FIGS. 2 through 4. As described above, the pair of cut valves 10 and the pipe joint 20 are connected by using the resin tubes 30. A length of the resin tube 30 is made to be longer than a length a constituted by connecting the connection tube portion 16 of the cut valve 10 and each of the connection tube portions 22b and 22c of the pipe joint 20 by a straight line and is preferably formed to be a length of 105 through 180 when the length a is made to constitute 100.

Further, when a center of the cut valve 10 is designated by notation b, an intersection of axis lines of the three connecting tube portions 22a, 22b, 22c formed at the pipe joint 20 (the intersection signifies a center of the pipe joint 20 according to the invention) is designated by notation c, and a straight line connecting the center b and the intersection c is designated by notation d, the connection tube portion 16 of the cut valve 10 is arranged to shift from the straight line d by a predetermined angle. in a horizontal direction, preferably, =5 through 60 degrees. In the case of the embodiment, the connection tube portions 16 of the pair of cut valves 10 are arranged to shift therefrom by the angle. in directions respectively opposed to each other. Similarly, it is preferable to arrange the connection tube portions 22b, 22c of the pipe joint 20 to be shifted from the straight lined by the predetermined angle.

Since the cut valve 10 and the pipe joint 20 are arranged to shift therefrom by the angle., the metal bracket 50 for fixing the cut valve 10 and the metal bracket 60 for fixing the pipe joint 20 are fixed by means of spot welding or the like in correspondence with the angle. That is, when the metal brackets 50 are attached with the pair of cut valves 10, and the metal bracket 60 is attached with the pipe joint 20, the connection tube portions 16 of the cut valves 10 and the connection tube portions 22b, 22c of the pipe joint 20 are arranged to shift from the straight line d by the angle.

Next, operation of the fuel vapor pipe structure 100 will be explained.

Before attaching the cut valves 10 and the pipe joint 20 to the fuel tank 70, the upper wall in the fuel tank 70 is attached with the metal brackets 50, 60 by means of spot welding or the like by angles in correspondence with the angle.

Further, the connecting tube portions 16 of the cut valves 10 and the connection tube portions 22b, 22c of the pipe joint 20 are connected respectively by the resin tubes 30. At this occasion, more or less dispersion is produced in the connection length by the resin tube 30 by an inserting margin of the resin tube 30. Further, the connection tube portion 22a of the pipe joint 20 and the connection tube portion 42 of the connector 40 is connected by another one of the resin tube 30.

After connecting the cut valves 10, the pipe joint 20 and the connector 40 respectively by the resin tubes 30 in this way, the cut valves 10 are engaged to fix to the metal brackets 50 by the above-described mode and the pipe joint 20 is engaged to fix to the metal bracket 60. Further, the connector 40 is connected to fix to an outside lead out pipe communicated with a canister, not illustrated.

At this occasion, the connection length of the resin tube 30 relative to the length a of connecting the connection-tube portion 16 of the cut valve 10 and each of the connection tube portions 22b and 22c of the pipe joint 20 by the straight line does not necessarily becomes the same as a designed value by a dispersion in the connection length of the resin tube 30 by the inserting margin, or a dispersion in a dimension of the resin tube 30, the cut valve 10, the pipe joint 20, the fuel tank 70 or the like. However, according to the invention, as described above, the length of the resin tube 30 is made to be longer than the above-described length a and preferably constitutes a length of 105 through 180 when the length a is made to constitute 100 and therefore, there is not a case in which the resin tube 30 cannot be attached thereto since the length becomes deficient, the resin tube 30 can be attached thereto with an allowance, thereby, sealing performance between the cut valve 10 and the resin tube 30 as well as between the pipe joint 20 and the resin tube 30 can be ensured.

Further, when the length of the resin tube 30 is made to be longer as described above, an extra length portion thereof hangs down to a lower side at a middle thereof and there is brought about a drawback of storing fuel when fuel vapor is liquefied at inside of the pipe, or the extra length portion interfered with other member, however, according to the invention, the connection tube portion 16 of the cut valve 10 and the connection tube portions 22b and 22c of the pipe joint 20 are arranged to shift from the straight line d by the angle. in the horizontal direction and therefore, the extra length portion is absorbed by bending the resin tube 30 in the horizontal direction. Therefore, there can be resolved the drawback of storing fuel by hanging down the resin tube 30 in the middle or interfering the resin tube 30 with other member thereby.

Further, as shown by FIG. 3, according to the embodiment, a pair of the cut valves 10 are provided at positions opposed to each other relative to the pipe joint 20, the connection tube portions 16, 16 of the pair of cut valves 10, 10 are arranged to shift from the straight line d in directions opposed to each other in the horizontal direction and therefore, the resin tubes are bent substantially in point symmetry centering on the pipe joint 20. Therefore, end portions of the respective resin tube 30 can be inserted to connect to the connection tube portions 22b, 22c of the pipe joint 20 substantially from coaxial directions and therefore, a forcible bent portion is not produced in the resin tube 30 and stresses applied on the pipe joint 20 and the resin tube 30 can be alleviated.

Further, although according to the embodiment shown in FIG. 4, the upper wall of the fuel tank 70 constitutes a plane and all of the pair of cut valves 10, 10 and the pipe joint 20 are arranged at the same plane, even when there is a stepped difference in the upper wall of the fuel tank and heights of attaching the pair of cut valves 10, 10 and the pipe joint 20 differ from each other, by shifting the connection tube portions 16, 22b and 22c from the straight line d respectively in the horizontal direction, operation and effect of the invention can be achieved.

Further, although according to a fuel tank made of a resin, generally, a cut valve is inserted to close an opening portion provided at an upper wall of the fuel tank to be welded to fix and a pipe joint is arranged at outside of the fuel tank, the invention is applicable also to a pipe structure in which a cut valve and a pipe joint arranged at outside of such a fuel tank is connected by a resin tube.

Figure 7:
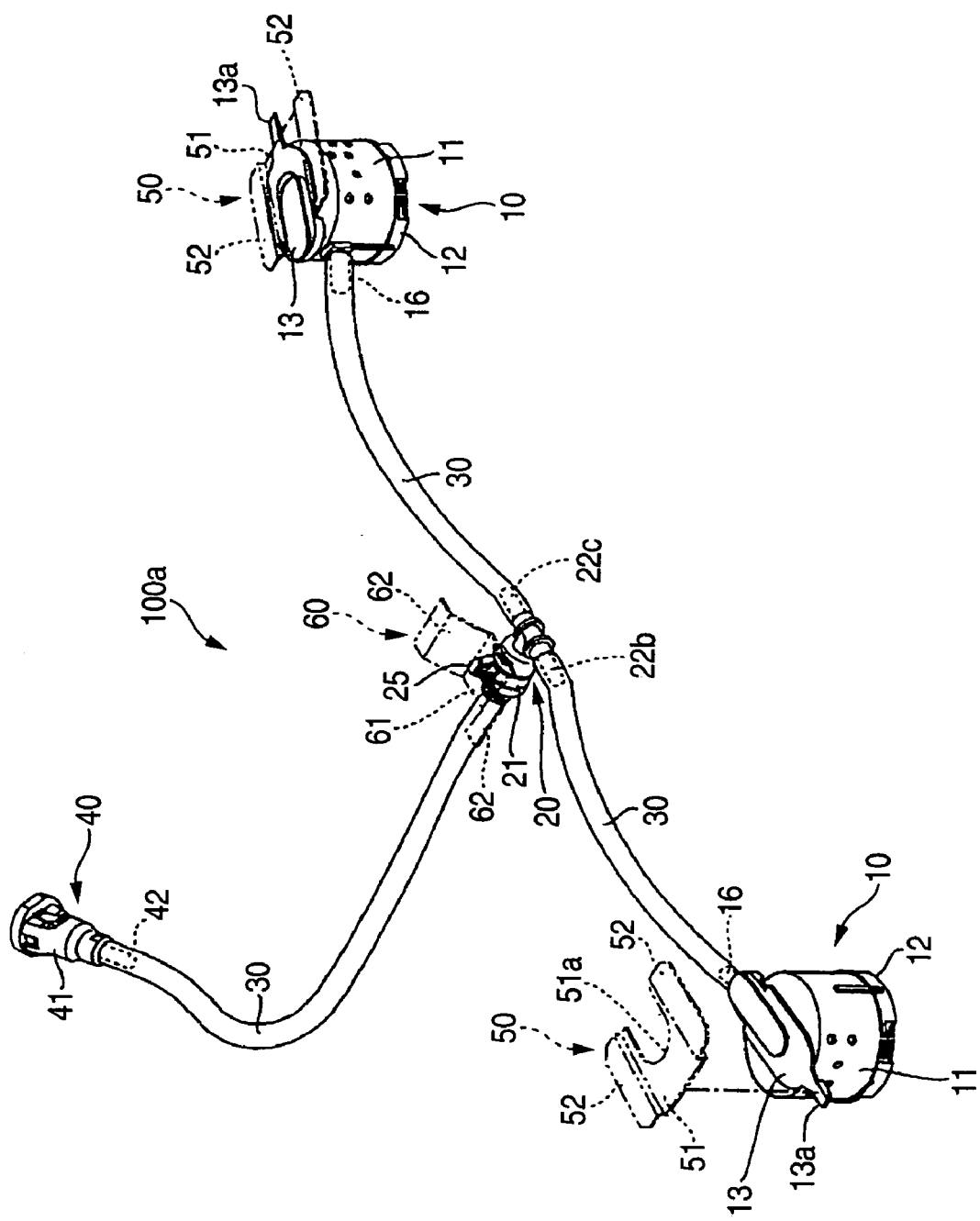
FIG. 7 is a perspective view showing other embodiment of a fuel vapor pipe structure of a fuel tank according to the invention.

FIG. 7 shows other embodiment of a fuel vapor pipe structure of a fuel tank according to the invention. According to a fuel vapor pipe structure 100a of the fuel tank, in comparison with the above-described embodiment, a direction of shifting the connection tube portion 16 of the cut valve 10 differs therefrom. That is, according to the embodiment, the connection tube portions 16 of the pair of cut valves 10 are shifted from the straight line d in the same direction. Also in the fuel vapor pipe structure 100a, operation and effect similar to those of the above-described embodiment can be achieved by making the length of the resin tube 30 longer than the length a constituted by connecting the connection tube portion 16 of the cut valve 10 and each of the connection tube portions 22b and 22c of the pipe joint 20 by the straight line and arranging the connection tube portions 16 of the cut valves 10 to shift from the straight line d by the predetermined angle. in the horizontal direction.

Figure 8A:
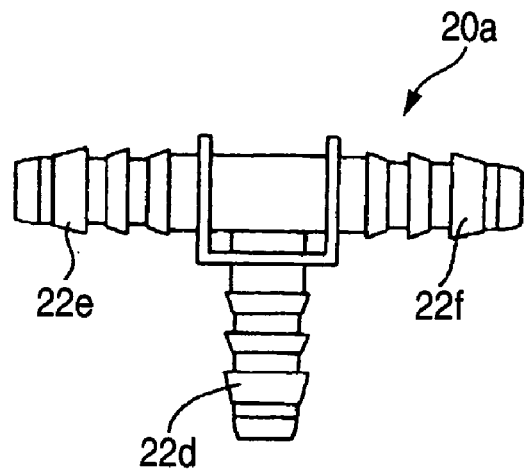
FIGS. 8A and 8B illustrate explanatory views showing other examples of pipe joints constituting a fuel vapor pipe structure of a fuel tank according to the invention.
Figure 8B:
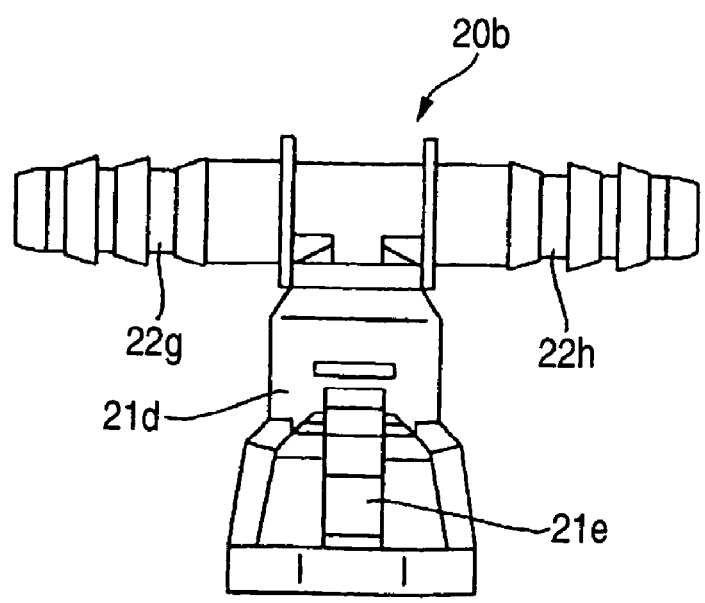

FIGS. 8A and 8B show other examples of the pipe joint 20 which is a constituent member of the fuel vapor pipe structure of the fuel tank according to the invention. That is, a pipe joint 20a shown in FIG. 8A is connected with three connection tube portions 22d, 22e, 22f in a T-like shape and the resin tubes 30 are respectively press-fitted thereto to connect. The pipe joint 20a does not include a check valve and the check valve is provided separately.

Also a pipe joint 20b shown in FIG. 8B does not include a check valve, the pipe joint 20b is directly formed with a connector 21d connected to a pipe communicating with a canister other than connection tube portions 22g, 22h connected to the connection tube portions 16 of the cut valves 10 via the resin tubes 30. The connector 21d includes a locking member 21e and is made to be able to connect to a pipe in one touch motion by inserting the pipe thereto.

In this way, according to the invention, the pipe joint is not limited to a pipe joint including the check valve but various structures thereof can be adopted.

The invention is applicable to a fuel vapor pipe of a fuel tank of an automobile and is particularly preferable for a pipe using a resin tube.

What is claimed is:

1. A fuel vapor pipe structure of a fuel tank, comprising:
a plurality of cut valves for passing a fuel vapor at inside of a fuel tank and cutting a path of a fuel when a liquid face of the fuel rises;
a pipe joint connected to cut valves for communicating the fuel vapor to a pipe for delivering the fuel vapor to a canister; and
a resin tube connecting one of said plurality of cut valves and the pipe joint, wherein
the resin tube uninstalled length is longer than a straight line distance between a connection tube portion of said one of said plurality of cut valves and the pipe joint, wherein the resin tube installed bent length is reduced by at least five percent in a straight line distance between ends of the resin tube, wherein the connection tube portion of said one of said plurality of cut valves is shifted from a straight line connecting a center of said one of said plurality of cut valves and a center of the pipe joint by a predetermined angle in a horizontal direction.

2. The fuel vapor pipe structure of a fuel tank according to claim 1, wherein
a pair of the plurality of cut valves are provided at positions opposed to each other relative to the pipe joint, the connection tube portions of the pair of cut valves are shifted from the straight line connecting the center of at least one of the pair of cut valves and the center of the pipe joint in directions opposed to each other in the horizontal direction.

3. The structure of claim 1, wherein said pipe joint comprises a check valve.

4. The structure of claim 1, wherein said resin tube is press-fitted around said connection tube of said at least one of said plurality of cut valves.

5. The structure of claim 1, further comprising:
   another resin tube connected to another connection tube of said pipe joint; and
   a connector connected to said another resin tube and communicating to an outside of said fuel tank.

6. The structure of claim 1, further comprising a metal bracket attached to the inside of said fuel tank and including a notched portion, wherein at least one of said plurality of cut valves comprises an inserting piece received by said notched portion.

7. The structure of claim 1, further comprising a metal bracket attached to the inside of said fuel tank and including an attaching hole, wherein said pipe joint comprises a clip received by said attaching hole.

8. A fuel vapor pipe structure for a fuel tank, comprising:
   a first cut valve inside said fuel tank;
   a first resin tube connected to a connection tube of the first cut valve; and
   a pipe joint having a first connection tube connected to said resin tube,
   wherein the resin tube uninstalled length is longer than a straight line distance between a connection tube portion of said one of said plurality of cut valves and the pipe joint, wherein the resin tube installed bent length is reduced by at least five percent in a straight line distance between ends of the resin tube, wherein the connection tube portion of said one of said plurality of cut valves is shifted from a straight line connecting a center of said one of said plurality of cut valves and a center of the pipe joint by a predetermined angle in a horizontal direction.

9. The structure of claim 8, further comprising:
   a second cut valve inside said fuel tank; and
   a second resin tube connected to a connection tube of the first cut valve and a second connection tube of said pipe joint.

10. The structure of claim 9, wherein said connection tube of said first cut valve is horizontally angled from a first straight line between said connection tube of said first cut valve and said first connection tube of said pipe joint and wherein said connection tube of said second cut valve is horizontally angled from a second straight line between said connection tube of said second cut valve and said second connection tube of said pipe joint.

11. The structure of claim 10, wherein said connection tube of said first cut valve is horizontally angled in the same direction as said connection tube of said second cut valve.

12. The structure of claim 10, wherein said connection tube of said first cut valve is horizontally angled in an opposite direction as said connection tube of said second cut valve.

13. The structure of claim 8, wherein said pipe joint comprises a check valve.

14. The structure of claim 8, wherein said first resin tube is press-fitted around said connection tube of said first cut valve.

15. The structure of claim 8, further comprising:
   a second resin tube connected to a second connection tube of said pipe joint; and
   a connector connected to said second resin tube and communicating to an outside of said fuel tank.

16. The structure of claim 8, further comprising a metal bracket attached to the inside of said fuel tank and including a notched portion, wherein said first cut valve comprises an inserting piece received by said notched portion.

17. The structure of claim 8, further comprising a metal bracket attached to the inside of said fuel tank and including an attaching hole, wherein said pipe joint comprises a clip received by said attaching hole.

18. A method connecting a fuel vapor pipe structure for a fuel tank, comprising:
   providing a plurality of cut valves for passing a fuel vapor at inside of a fuel tank and cutting a path of a fuel when a liquid face of the fuel rises;
   providing a pipe joint connected to cut valves for communicating the fuel vapor to a pipe for delivering the fuel vapor to a canister; and
   connecting a resin tube to one of said plurality of cut valves and the pipe joint, wherein said connecting said resin tube reduces an uninstalled length by at least five percent in a straight line distance between ends of said resin tube.

19. The method of claim 18, further comprising providing a resin tube having a straight line distance between ends of said resin tube that is at least five percent longer than a straight line distance between one of said plurality of cut valves and the pipe joint.

20. The method of claim 18, wherein said connecting said resin tube comprises press-fitting said resin tube to said one of said plurality of cut valves and said pipe joint.

* * * * *